US008547969B2

(12) United States Patent
Watfa et al.

(10) Patent No.: US 8,547,969 B2
(45) Date of Patent: Oct. 1, 2013

(54) METHOD AND APPARATUS FOR PROVIDING NON-PACKET SWITCHED SERVICE IN A TARGET RADIO ACCESS TECHNOLOGY NETWORK

(75) Inventors: Mahmoud Watfa, Saint Leonard (CA); Behrouz Aghili, Commack, NY (US); Peter S. Wang, East Setauket, NY (US); Ulises Olvera-Hernandez, Kirkland (CA); Shankar Somasundaram, London (GB)

(73) Assignee: Interdigital Patent Holdings, Inc., Wilmington, DE (US)

( * ) Notice: Subject to any disclaimer, the term of this patent is extended or adjusted under 35 U.S.C. 154(b) by 635 days.

(21) Appl. No.: 12/729,775

(22) Filed: Mar. 23, 2010

(65) Prior Publication Data

US 2010/0296421 A1 Nov. 25, 2010

Related U.S. Application Data

(60) Provisional application No. 61/165,076, filed on Mar. 31, 2009.

(51) Int. Cl.
*H04L 12/50* (2006.01)

(52) U.S. Cl.
USPC ............ 370/353; 370/352; 370/354; 370/355

(58) Field of Classification Search
USPC .......................................... 370/353, 354, 355
See application file for complete search history.

(56) References Cited

U.S. PATENT DOCUMENTS

| | | | | |
|---|---|---|---|---|
| 6,119,000 | A * | 9/2000 | Stephenson et al. | 455/432.1 |
| 2003/0050076 | A1 * | 3/2003 | Watanabe | 455/456 |
| 2004/0185851 | A1 * | 9/2004 | Nagai | 455/436 |
| 2006/0040681 | A1 * | 2/2006 | Julka et al. | 455/458 |
| 2007/0213059 | A1 | 9/2007 | Shaheen | |
| 2008/0037515 | A1 * | 2/2008 | Sander | 370/352 |

FOREIGN PATENT DOCUMENTS

| | | |
|---|---|---|
| WO | 07130281 A2 | 11/2007 |
| WO | 09021009 A1 | 2/2009 |

OTHER PUBLICATIONS

Third Generation Partnership Project, "Technical Specification Group Core Network and Terminals; Mobile radio interface Layer 3 specification; Core network protocols; Stage 3 (Release 7)", 3GPP TS 24.008 V7.14.0 (Mar. 2009).

(Continued)

*Primary Examiner* — Huy D Vu
*Assistant Examiner* — Teisha D Hall
(74) *Attorney, Agent, or Firm* — Volpe and Koenig, P.C.

(57) ABSTRACT

A method and apparatus are described for providing non-packet switched service to a target radio access technology (RAT) network. A circuit switched (CS) service notification message is received by a wireless transmit/receive unit (WTRU). If the WTRU has been allocated a valid temporary mobile subscriber identity (TMSI), a paging response message including the valid TMSI is transmitted after an inter-system change is performed from a source RAT network to a target RAT network. The CS service notification message is for terminating a CS call request. The source RAT network may be a long term evolution (LTE) network, and the target RAT network may be a third generation partnership project (3GPP) network. Alternatively, if the WTRU has not been allocated a valid TMSI, a paging response message including an international mobile subscriber identity (IMSI) that identifies the WTRU is transmitted after the inter-system change.

22 Claims, 3 Drawing Sheets

(56) References Cited

OTHER PUBLICATIONS

Third Generation Partnership Project, "Technical Specification Group Core Network and Terminals; Mobile radio interface Layer 3 specification; Core network protocols; Stage 3 (Release 8)", 3GPP TS 24.008 V8.4.0 (Dec. 2008).
Third Generation Partnership Project, "Technical Specification Group Core Network and Terminals; Mobile radio interface Layer 3 specification; Core network protocols; Stage 3 (Release 8)", 3GPP TS 24.008 V8.8.0 (Dec. 2009).
Third Generation Partnership Project, "Technical Specification Group Core Network and Terminals; Mobile radio interface Layer 3 specification; Core network protocols; Stage 3 (Release 9)", 3GPP TS 24.008 V9.1.0 (Dec. 2009).
Third Generation Partnership Project, "Technical Specification Group Core Network and Terminals; Non-Access-Stratum (NAS) Protocol For Evolved Packet System (EPS); Stage 3 (Release 8)", 3GPP TS 24.301 V8.1.0, (Mar. 2009).
Third Generation Partnership Project, "Technical Specification Group Core Network and Terminals; Non-Access-Stratum (NAS) Protocol For Evolved Packet System (EPS); Stage 3 (Release 8)", 3GPP TS 24.301 V8.4.0, (Dec. 2009).
Third Generation Partnership Project, "Technical Specification Group Core Network and Terminals; Non-Access-Stratum (NAS) Protocol For Evolved Packet System (EPS); Stage 3 (Release 9)", 3GPP TS 24.301 V9.1.0 (Dec. 2009).
Third Generation Partnership Project, "Technical Specification Group Core Network and Terminals; General Packet Radio Service (GPRS); Serving GPRS Support Node (SGSN)—Visitors Location Register (VLR); Gs Interface Layer 3 Specification (Release 8)", 3GPP TS 29.018 V8.2.0 (Mar. 2009).
Third Generation Partnership Project, "Technical Specification Group Core Network and Terminals; General Packet Radio Service (GPRS); Serving GPRS Support Node (SGSN)—Visitors Location Register (VLR); Gs Interface Layer 3 Specification (Release 9)", 3GPP TS 29.018 V9.0.0 (Dec. 2009).
Third Generation Partnership Project, "Technical Specification Group Radio Access Network; Evolved Universal Terrestrial Radio Access (E-UTRA) Radio Control (RRC); Protocol Specification (Release 8)", 3GPP TS 36.331, V8.5.0, (Mar. 2009).
Third Generation Partnership Project, "Technical Specification Group Radio Access Network; Evolved Universal Terrestrial Radio Access (E-UTRA) Radio Control (RRC); Protocol Specification (Release 8)", 3GPP TS 36.331, V8.8.0, (Dec. 2009).
Third Generation Partnership Project, "Technical Specification Group Radio Access Network; Evolved Universal Terrestrial Radio Access (E-UTRA) Radio Resource Contol (RRC); Protocol Specification (Release 9)", 3GPP TS 36.331, V9.1.0, (Dec. 2009).
"Digital cellular telecommunications system (Phase 2+); Universal Mobile Telecommunications System (UMTS); LTE; Mobile radio interface Layer 3 specification; Core network protocols; Stage 3 (3GPP TS 24.008 version 8.5.0 Release 8)," ETSI TS 124 008 V8.5.0 (Mar. 2009).
Nec et al., "Pseudo-CR on 'CS Service Notification'," 3GPP TSG CT WG1 Meeting #56, C1-084781 (Nov. 10-14, 2008).

Interdigital LLC, "Mobile Id for Paging Response," 3GPP TSG CT WG1 Meeting #58, C1-092164 (Apr. 20-24, 2009).
Interdigital LLC, "Sending UE Id in the CS Service Notification," 3GPP TSG CT WG1 Meeting #58, C1-092159 (Apr. 20-24, 2009).
Third Generation Partnership Project, "Technical Specification Group Services and System Aspects; Circuit Switched Fallback in Evolved Packet System; Stage 2 (Release 8)", 3GPP TS 23.272 V8.3.0, (Mar. 2009).
Third Generation Partnership Project, "Technical Specification Group Services and System Aspects; Circuit Switched Fallback in Evolved Packet System; Stage 2 (Release 8)", 3GPP TS 23.272 V8.6.0, (Dec. 2009).
Third Generation Partnership Project, "Technical Specification Group Services and System Aspects; Circuit Switched Fallback in Evolved Packet System; Stage 2 (Release 9)", 3GPP TS 23.272 V9.2.0 (Dec. 2009).
Third Generation Partnership Project, "Technical Specification Group Services and System Aspects; General Packet Radio Service (GPRS) enhancements for Evolved Universal Terrestrial Radio Access Network (E-UTRAN) Access (Release 8)", 3GPP TS 23.401 V8.5.0 (Mar. 2009).
Third Generation Partnership Project, "Technical Specification Group Services and System Aspects; General Packet Radio Service (GPRS) enhancements for Evolved Universal Terrestrial Radio Access Network (E-UTRAN) Access (Release 8)", 3GPP TS 23.401 V8.8.0 (Dec. 2009).
Third Generation Partnership Project, "Technical Specification Group Services and System Aspects; General Packet Radio Service (GPRS) enhancements for Evolved Universal Terrestrial Radio Access Network (E-UTRAN) Access (Release 9)", 3GPP TS 23.401 V9.3.0 (Dec. 2009).
Third Generation Partnership Project, "Technical Specification Group Core Network and Terminals; Mobile radio interface Layer 3 specification; Core network protocols; Stage 3 (Release 6)", 3GPP TS 24.008 V6.19.0 (Jun. 2008).
Third Generation Partnership Project, "Technical Specification Group Core Network and Terminals; Non-Access-Stratum (NAS) Protocol For Evolved Packet System (EPS); Stage 3 (Release 9)", 3GPP TS 24.301 V9.1.0, (Dec. 2009).
Third Generation Partnership Project, "Technical Specification Group Core Network and Terminals; General Packet Radio Service (GPRS); Serving GPRS Support Node (SGSN)—Visitors Location Register (VLR); Gs Interface Layer 3 Specification (Release 8)", 3GPP TS 29.018 V8.2.0 (Mar. 2009)
Third Generation Partnership Project, "Technical Specification Group Radio Access Network; Evolved Universal Terrestrial Radio Access (E-UTRA) Radio Resouce Control (RRC); Protocol Specification (Releae 8)", 3GPP TS 36.331, V8.5.0), (Mar. 2009).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.8.0, (Dec. 2009).
Third Generation Partnership Project, "Technical Specification Group Radio Access Network; Evolved Universal Terrestrial Radio Acces (E-UTRA) Radio Resource Control (RRC); Protocol Specification (Release 9)", 3GPP TS 36.331 V9.1.0, (Dec. 2009).

* cited by examiner

US 8,547,969 B2

METHOD AND APPARATUS FOR PROVIDING NON-PACKET SWITCHED SERVICE IN A TARGET RADIO ACCESS TECHNOLOGY NETWORK

CROSS REFERENCE TO RELATED APPLICATIONS

This application claims the benefit of U.S. Provisional Application No. 61/165,076 filed Mar. 31, 2009, which is incorporated by reference as if fully set forth herein.

FIELD OF INVENTION

This application is related to wireless communications.

BACKGROUND

An evolved packet system (EPS) provides both packet switched service (PSS) and non-packet switched service (NPSS). An example of an NPSS is a circuit switched fallback (CSFB) feature where, even though signaling for a circuit switched (CS) service request is performed over the EPS, a wireless transmit/receive unit (WTRU) is directed to a legacy network where the actual call set-up signaling and user data functions are provided. Another example of NPSS is the provisioning of a short message service (SMS) over an EPS control plane.

It is also possible to provide SMS over an Internet protocol (IP) network, such as the EPS network, but in this case the SMS is simply carried over the user/data plane of the EPS and is not considered an NPSS.

However, in order to provide NPSS, a mobility management entity (MME) in an long term evolution (LTE) network uses an 'SGs' interface with the mobile switching center (MSC)/visitor location register (MSC/VLR). Furthermore, the WTRU registers for both PSS and NPSS, (i.e., the WTRU is attached to both packet switched (PS) and CS domains), either by performing a combined EPS/international mobile subscriber identity (IMSI) attach procedure, or by performing a combined tracking area (TA)/location area (LA) update procedure. For the WTRU to perform a combined registration, it has to know, a priori, that the MME to which it is registered, or is about to register to, has an SGs interface with the MSC/VLR.

Currently, it has not been standardized whether the network broadcasts or advertises the existence of the SGs interface, (e.g., using system information (SI) messages), or whether a WTRU that accesses both PS and NPSS always requests a combined registration. Thus, it is not clear how a WTRU that supports CSFB and/or generic CS over EPS services, (possibly with a different network architecture), can determine whether messages that it receives, (either paging in idle mode or non-access stratum (NAS) messages in connected mode), are associated with CSFB or CS over EPS.

Based on the above, a method and apparatus are desired that provide non-packet switched service in a target RAT network to differentiate between messages that are associated with CSFB and messages that are associated with CS over EPS, without overloading the signaling or the system requirements.

SUMMARY

A method and apparatus are described for providing non-packet switched service to a target radio access technology (RAT) network. A CS service notification message is received by a WTRU. If the WTRU has been allocated a valid temporary mobile subscriber identity (TMSI), a paging response message including the valid TMSI is transmitted after an inter-system change is performed from a source RAT network to a target RAT network. The CS service notification message is for terminating a CS call request. The source RAT network may be an LTE network, and the target RAT network may be a third generation partnership project (3GPP) network. Alternatively, if the WTRU has not been allocated a valid TMSI, a paging response message including an IMSI that identifies the WTRU is transmitted after the inter-system change is performed.

BRIEF DESCRIPTION OF THE DRAWINGS

A more detailed understanding may be had from the following description, given by way of example in conjunction with the accompanying drawings wherein.

DETAILED DESCRIPTION

Figure 1:
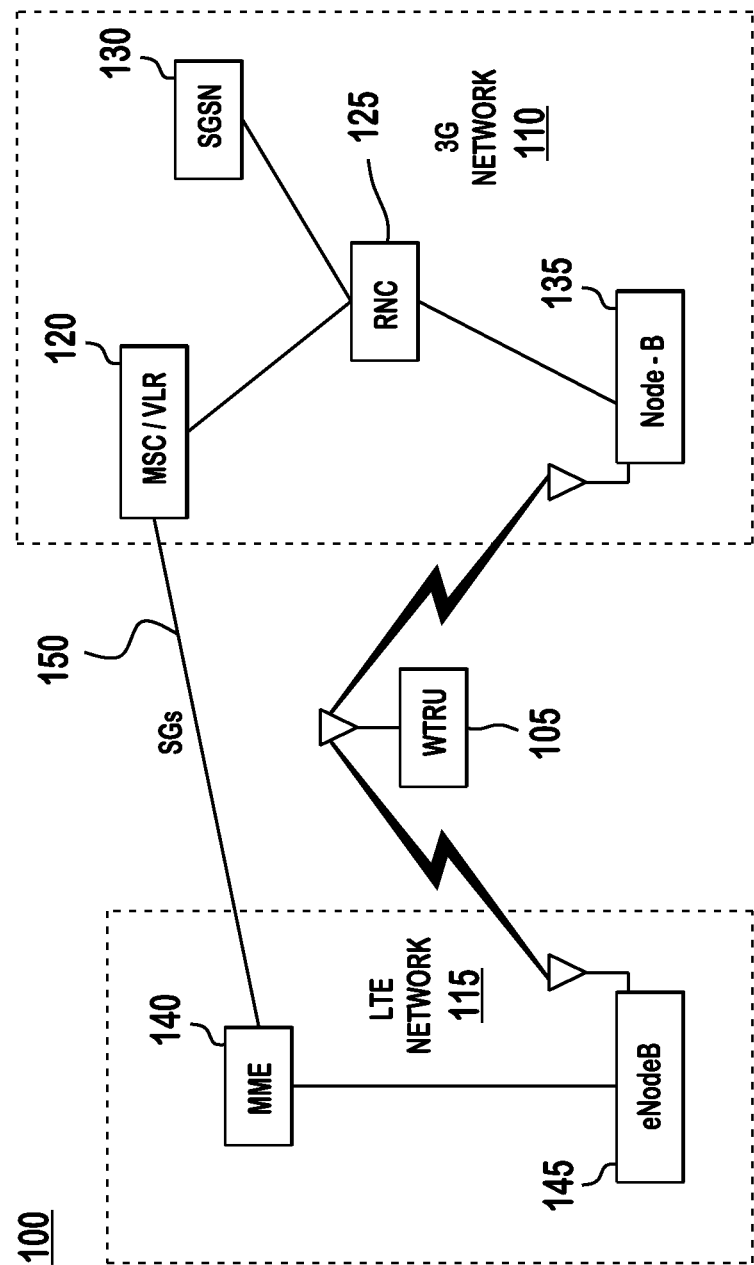
FIG. 1 shows a wireless communication system that provides 3G and LTE coverage to a WTRU.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment.

Also, the term "wireless transmit/receive unit (WTRU)" refers to a WTRU that is capable and configured to use both PS and NPSS. Moreover, NPSS is not limited to just SMS or CSFB, or NPSS generic CS over EPS.

When referred to hereafter, the terminology "Node-B" includes but is not limited to a base station, an evolved Node-B (eNodeB), a site controller, an access point (AP), or any other type of interfacing device capable of operating in a wireless environment.

Depending on the WTRU state, a WTRU receives different indications about a terminating a CS call request. In idle mode, a WTRU is paged with a radio resource control (RRC) paging message. The paging message includes an indication of the core network domain that initiated the paging. For a CS call, the core network domain indicates 'cs'. Moreover, the WTRU may be paged with either a temporary identity, (e.g., the WTRU system architecture evolution (SAE)-temporary mobile subscriber identity (S-TMSI)), or an IMSI. If the WTRU is paged with an S-TMSI, the WTRU may, upon an inter-system change (e.g., a PS handover) to the target RAT network, send a paging response carrying a TMSI as the WTRU's identity, (using signaling messages processed by the target RAT network).

On the other hand, if the WTRU is paged with the IMSI in EPS, the WTRU may send a paging response to the target RAT network with its IMSI as its identity.

In the connected mode, a WTRU does not receive paging messages. As such, a NAS message, (e.g., a NAS CS service notification message), is sent to the WTRU to indicate a terminated CS call request.

In an inter-system change situation (e.g., handover) where, for example, the WTRU is moving from a global system for mobile communications (GSM)/enhanced data rates for GSM evolution (EDGE) radio access network (GERAN)/ universal terrestrial radio access network (UTRAN) to an evolved-UTRAN (E-UTRAN), or from a non-third generation partnership project (non-3GPP) access, (e.g., code division multiple access (CDMA) 2000), to E-UTRAN, the WTRU may initiate a TA update (TAU) procedure in E-UTRAN as specified in general packet radio service (GPRS) enhancements for E-UTRAN access. However, there is no information available to the WTRU that may be used to decide whether or not a combined TA/LA update procedure will be initiated by the WTRU upon access to the E-UTRAN, (to register for NPSS, e.g., CSFB). Thus, the WTRU does not know if the E-UTRAN, (or, more specifically, the MME in the target E-UTRAN cell), supports NPSS, or alternatively, if a specific interface for provisioning of NPSS (e.g., SGs) exists.

A WTRU, currently connected to an E-UTRAN, does not have complete knowledge of the target RAT network's architecture or supported interfaces. As an example, the WTRU does not know if there is a 'Gs' interface; an interface between the serving GPRS support node (SGSN) and a VLR, in the target RAT network (e.g., GERAN/UTRAN) to which it is directed as part of the CSFB procedure. As such, the WTRU cannot immediately know if a combined routing/location area update should be performed in the target system, versus independent routing and location area update procedures. The lack of such information adds delay to the call setup time, because the WTRU may be required to decode the SI messages in the target system, and then may perform independent updating procedures which take longer than a combined procedure.

Information related to the support of non-packet switched services (NPSS) or circuit switched (CS) services may be included in a target E-UTRAN cell. One way to facilitate an inter-RAT transfer is to include information in any mobility message that is sent to the WTRU from the source system, (e.g., RRC message in GSM/UTRAN, or radio link control (RLC)/medium access control (MAC) message in enhanced GPRS (EGPRS)), indicating whether NPSS is supported (or not) in a target RAT network that is primarily supporting PSS such as the EPS. As such, the WTRU uses this information to determine what type of TAU procedure should be performed.

For example, the information that may be included in the mobility messages is CSFB supported. This indicates that the target RAT network supports CSFB, implying that there is an SGs interface between the MME and the MSC/VLR. Furthermore, this may indicate that SMS and possibly SS services are supported over the EPS control plane as well.

In another example, the information that may be included in the mobility messages is native SMS supported. This indicates that SMS over the EPS control plane (and possibly switched service (SS)) is supported, but CSFB is not.

In another example, the information that may be included in the mobility messages is IP based-services. This information may indicate that SMS or other services are supported only over the IP user/data plane.

In another example, the information that may be included in the mobility messages is other CS over PS services. This information may indicate that CS over PS services are supported and similar indications, such as those for CSFB, are to be used.

In another example, the information that may be included in the mobility messages is an interface indication. This information may be used to inform the WTRU that a specific interface exists between the MME and another network node. The network architecture is thus inferred from this indication. Moreover, this also indicates all of the supported CS over PS services via this interface.

In another example, the information that may be included in the mobility messages is voice over IP (VoIP). This information indicates whether VoIP services are supported, (e.g., via IMS), in E-UTRAN. If so, the WTRU may optionally deactivate its CSFB functionality, but it may still send SMS via LTE, (implicitly implying the existence of the SGs interface for the purpose of SMS and/or SS).

In another example, the information that may be included in the mobility messages is instant messaging (IM). This information indicates whether or not instant messaging (e.g., using the session initiated protocol (SIP)) is supported in E-UTRAN.

In another example, the information that may be included in the mobility messages may be used to show that a specific combination of all of the above is supported in the target EPS network.

In another example, the information that may be included in the mobility messages supports an emergency call in a target RAT. This information may be generalized, whereby an emergency call is initially indicated that is supported in the target RAT, and then determines the type of emergency call (e.g., CS, IMS) is upon access to the target RAT. Alternatively, this information may be very detailed, (e.g., support of emergency call via IMS, support of emergency call via CSFB, or support of emergency call via CS over PS). A combination, for example, of an IMS and CS over PS emergency call support indication, may also be used.

The information included in the mobility messages may be received by the EMM (or NAS) either as an indication from the LTE RRC, or in a NAS dedicated container that is transparent to the LTE RRC. The EPS NAS may then know whether or not NPSS is provided in an EPS network, (or if a specific interface is implemented in the future). Thus, the EPS NAS may then send the necessary registration message in the target EPS network upon performing an inter-system change.

For example, the information may be included in the mobility messages in the form of a bit map, where each bit specifies the support of a particular NPSS or an interface. Alternatively, values may be assigned to each of the different NPSSs, and signaled to the WTRU.

The WTRU may request network capabilities when performing intra-LTE handover, (i.e., from one E-UTRAN cell to another), whereby the target RAT network may or may not support CSFB or CS over PS, or IMS/VoIP. The WTRU may use the information included in the mobility messages when entering a cell, wherein a particular service is supported or not, and take specific actions. In the case of intra-frequency and inter-frequency handovers, the WTRU, for the cells it measures, may request the network to provide the target cell capabilities. This request may be sent in a "request network capability message," which may be a separate RRC message or may be part of an existing RRC message. The WTRU may also provide the services it expects in the target cell. The network may contact the target cell and provide the WTRU with the target cell's capabilities in a response message, which may then be used by the WTRU along with the signal strength of the network to prioritize the cells it wants to handover to and report this information to the network in priority order. The network may then send the WTRU to the cell the WTRU has expressed the most preference for.

Another way to facilitate inter-RAT transfer is to include information in E-UTRAN system information block (SIB) messages about the support of CS over PS, (e.g., in an EPS network). Alternatively, the SIBs may indicate a specific architecture support or the existence of a specific interface. This may be used to infer the type of services that the network supports. The information about the service or the interface may be included in SIB1 or any other higher priority SIB. Before handover, the WTRU may then only have to read these particular SIBs and determine, based on the services the target cell provides, whether it wants to handover or not.

Moreover, broadcast information may be included to indicate whether there is emergency call support using the CS over PS solution.

If a WTRU is only capable of CS over PS, and is on an E-UTRAN cell in which no CS over PS is supported, or an emergency call is not supported with a CS over PS solution, the WTRU may change to another RAT network when an emergency call request is made. When in idle mode, the WTRU may change to another RAT network. If in connected mode, the WTRU may locally release its RRC connection and change to another RAT network. Optionally, the network may be notified about the event so that the WTRU will not be paged or contacted when it is on another RAT network. When releasing the connection, the RRC may indicate the release to the upper layers, (e.g., the NAS), with a release cause set to "other call" or "emergency call."

For a WTRU that is CS over PS capable, but does not have a universal subscriber identity module (USIM), the WTRU may reselect to anther RAT that supports emergency service without a USIM. Alternatively, the network may support an emergency call using CS over PS, even if the WTRU does not have a USIM. Thus, the WTRU may indicate in its request message that it is desired to perform an emergency call and (optionally) that no USIM is available. The request message may either be a NAS message, another dedicated message for CS over PS, an attach message, (if this is needed to obtain CS over PS services), or a TAU, (if this is needed to obtain CS over PS services).

Moreover, a new establishment cause may be used to indicate an emergency call for CS over PS, (optionally for the case with a USIM available), and another cause for the case when no USIM is available.

Another way to facilitate inter-RAT transfer is to include information related to the target network in any mobility message that is sent to the WTRU in an E-UTRAN during an inter-system change due to a handover in general, or due to handover as part of a CSFB procedure. For example, this information may be included in a target network container information element (IE), or it may be a legacy NAS signaling dedicated IE. Information that may be included in E-UTRAN mobility messages is an indication of whether or not the 'Gs' interface is supported in a target network. Other information that may be included in E-UTRAN mobility messages is the type of mode of operation that the network supports and the mode of operation that the WTRU may use in a target RAT. For example, a WTRU may be informed if dual transfer mode is supported in a target GERAN cell. Other information that may speed up the establishment of NAS and/or RRC connection establishment includes important segments of system information messages that may otherwise only be obtained by reading system information. As an example, vital IEs of the target network system information messages, (e.g., "GPRS cell option IE"), may be sent to the WTRU.

FIG. 1 shows a wireless communication system 100 that provides a third generation (3G) network 110 and an LTE network 115. The 3G network 110 includes an MSC/VLR 120, a radio network controller (RNC) 125, an SGSN 130 and a Node-B 135. The LTE network 115 includes an MME 140 and an eNodeB 145. The MME 140 and the MSC/VLR 120 communicate via an SGs interface 150.

Figure 2:
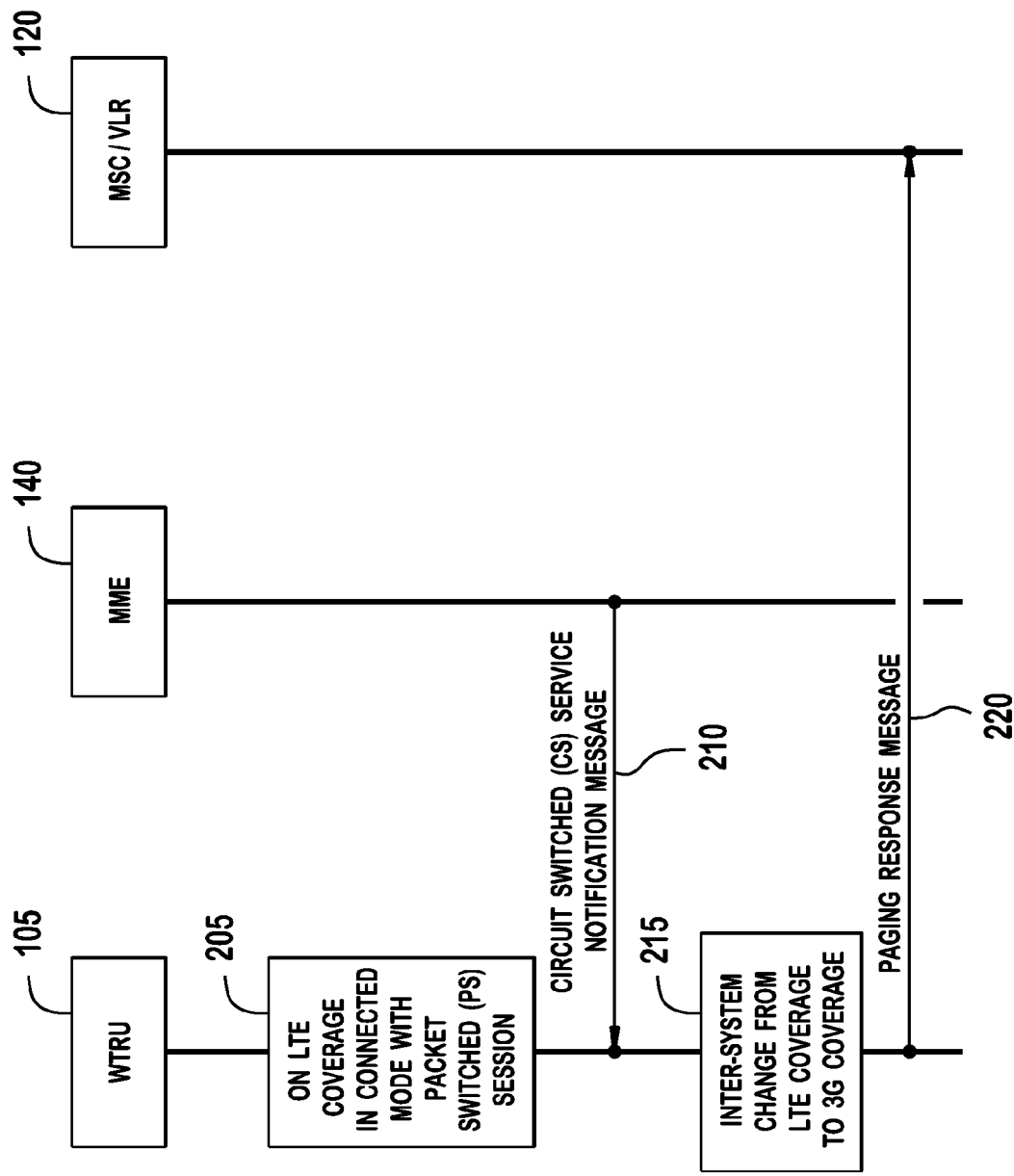
FIG. 2 is a flow diagram of a WTRU identity procedure implemented in the wireless communication system of FIG. 1.

FIG. 2 is a flow diagram of a WTRU identity procedure implemented in the wireless communication system 100. The WTRU 105 is on LTE coverage in connected mode with a PS session (205). A CS service notification message is transmitted from the MME 140 to the WTRU 105 (210). The WTRU performs an inter-system change (215) from LTE coverage (i.e., the source RAT network) to 3G coverage (i.e., the target RAT network). The WTRU 105 then transmits a paging response message to the MSC/VLR 120 (220).

Figure 3:
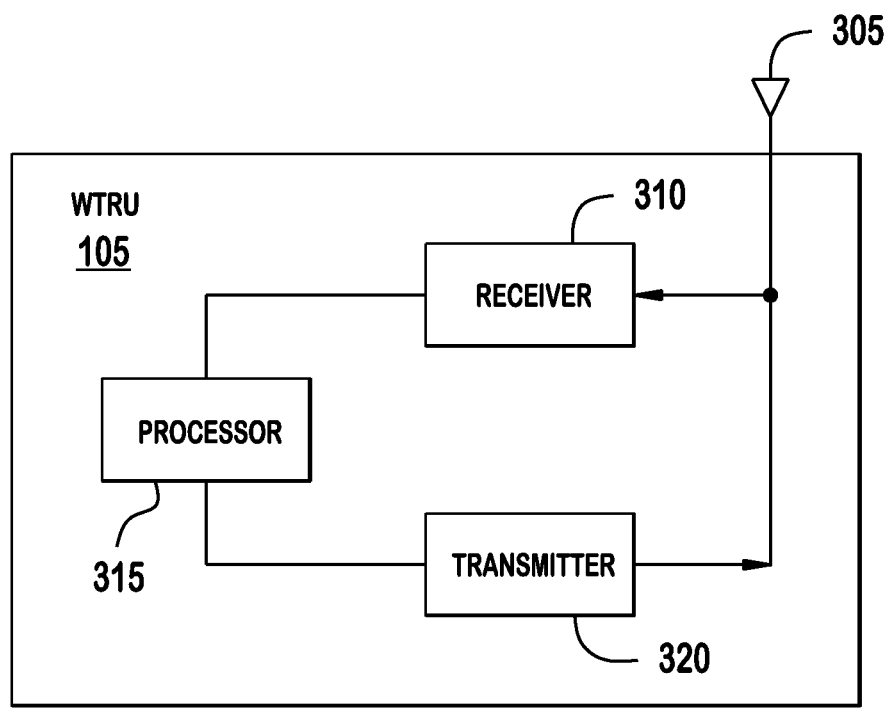
FIG. 3 is an exemplary block diagram of the WTRU.

FIG. 3 is an exemplary block diagram of the WTRU 105. The WTRU 105 includes an antenna 305, a receiver 310, a processor 315 and a transmitter 320. The receiver 310 is configured to receive a CS service notification message from the MME 140 (also see FIGS. 1 and 2) via the antenna 305. The transmitter 320 is configured to transmit a paging response message to the MSC/VLR 120 via the antenna 305.

The following schemes may be used by the WTRU 105 to identify itself when sending a paging response message to a target network as per the CSFB procedure, where the WTRU 105, initially in EPS, has received a CS service notification message for a terminating CS call request.

In one scheme, the WTRU 105 is allocated a valid TMSI in EPS. On a condition that the WTRU 105 has a valid TMSI, (e.g., allocated during the last combined attach or TAU procedure that was performed), when a NAS CS service notification is received, the WTRU 105 sends a page response message in the target network that includes a TMSI as its identity. This identity may also be used in any other NAS message, (e.g., location area update, connection management (CM) service request), prior to or after sending the paging response message, (assuming that the VLR does not allocate a new TMSI for the WTRU 105), and is thus not limited to the use of a paging response message only.

In another scheme, the WTRU 105 does not have a valid TMSI in EPS. If the WTRU 105 does not have a valid TMSI when it receives a NAS CS service notification message while on LTE coverage, the WTRU sends a paging response message that includes its IMSI as its identity to use in the target RAT network. This identity may also be used in any other NAS message, (e.g., location area update, CM service request), prior to or after sending the paging response message and is thus not limited to the use of a paging response message only.

In another scheme, the WTRU 105 receives an "explicit indication" as to what identity is to be used in the target network. The CS service notification message may include an explicit indication as to what identity the WTRU 105 is to use when it goes to the target network, (and sends a paging response message).

In one example, an identity IE is included in the CS service notification message. If the IE indicates the IMSI of the WTRU 105, then the WTRU 105 uses its IMSI as the identity in the target network when sending any initial NAS message or paging response message. If the IE indicates the TMSI allocated for the WTRU 105 (in E-UTRAN), then the WTRU 105 uses its TMSI as the identity in the target network when sending any initial NAS message or paging response message. If the IE is not be mapped to the IMSI or TMSI of the WTRU 105, the WTRU may use its IMSI as the default identity when sending any initial NAS message or page response message in the target network.

In another example, an indicator, (e.g., in the form of one or more bits), is included in the CS service notification message. Assuming one bit is used, a value of 0 indicates the use of the current TMSI in the target network, and a value of 1 indicates the use of the IMSI in the target network. If the WTRU 105 does not have a valid TMSI, and an indication to use a TMSI is included in the CS service notification message, then the WTRU 105 may use its IMSI instead. In the case that the WTRU 105 has a valid TMSI, the WTRU 105 will comply with the indication even if it is indicated that an IMSI be used in the target network.

Referring again to FIG. 3, the WTRU 105 provides non-packet switched service during handover between different RAT networks. The receiver 310 in the WTRU 105 may be configured to receive a CS service notification message, wherein the WTRU has been allocated a valid TMSI. The transmitter 320 may be configured to transmit a paging response message including the valid TMSI after an inter-system change is performed from a source RAT network to a target RAT network. The CS service notification message is for terminating a CS call request. The source RAT network may be an LTE network, and the target RAT network may be a third generation partnership project (3GPP or 3G) network.

The receiver 310 in the WTRU 105 may be configured to receive a CS service notification message, wherein the WTRU has not been allocated a valid TMSI. The transmitter 320 in the WTRU may be configured to transmit a paging response message including an IMSI that identifies the WTRU after a handover is performed from a source RAT network to a target RAT network.

The receiver 310 in the WTRU 105 may be configured to receive a CS service notification message, including an explicit indication of the identity the WTRU is to use after performing an inter-system change from a source RAT network to a target RAT network. The transmitter 320 in the WTRU 105 may be configured to transmit a paging response message including the explicit indication after the handover is performed. The explicit indication may be an information element (IE) that indicates an IMSI of the WTRU, or an IE that indicates a TMSI allocated for the WTRU. The explicit indication may include at least one bit, whereby a bit value of one indicates that an IMSI of the WTRU should be used after the handover, and a bit value of zero indicates that a TMSI allocated for the WTRU should be used after the handover.

Another procedure that may be used to facilitate inter-RAT transfer includes the WTRU receiving clear indications as to which type of service it is being notified about, (via paging or NAS messages). As mentioned earlier, the CS service that may be provided in EPS may be either CSFB and/or CS over EPS.

An explicit indication in the CS Service Notification is used to inform the WTRU that the request is for CSFB or CS over PS. An IE that indicates the CS service type, (i.e., CSFB or CS over PS), may be used. Other information may also be included for each option, e.g., CS over PS, and the actual request is a "CS voice call." This scheme may be used for a WTRU that is capable of any combination of features, e.g., both CSFB and CS over PS, or CS over PS and IMS/VoIP. This indication may also be implemented in the form of a bitmap (one or more bits). Alternatively, this indication may only be included for CS over PS when the WTRU is capable of both CSFB and CS over EPS. Otherwise, if absent, the WTRU considers the service type as being CSFB.

The use of a different NAS message to indicate a terminated request for CS over PS or any other service may be used. As such, the WTRUs that are capable of both CSFB and CS over PS may differentiate what type of service is to be expected and what response is used. For example, a new "CS over PS service notification message" may be used for CS over PS terminated services when the WTRU is in connected mode. Furthermore, the actual request, e.g., a "terminating CS voice call", may be included in the message.

A different core network domain indicator for CS over PS Services may be used in paging messages. A new core domain indicator is used for every service, e.g., CS over PS. Currently, with CSFB as the only CS service through EPS, the corresponding core domain indicator for CS call paging is "CS." If the WTRU receives a value of "PS" instead, then the WTRU knows that the paging is for EPS packet services. Thus, the use of a new core domain indicator, namely 'CS over PS', may be used to precisely specify the domain that triggered the paging.

Another way to facilitate an inter-RAT transfer is by the WTRU using the current extended service request message with a new service type set to "mobile terminated CS over PS" and a response IE having values including 'CS over PS Accepted' and "CS over PS rejected". Alternatively, a new message may be defined to respond to a terminating CS over PS request. This message may also have a response IE as defined above.

The service request may also be used, and optionally with a request type set to "mobile terminated CS over PS", to respond to the terminating request. This message may also have a response IE as defined above.

Another way to facilitate an inter-RAT transfer is that the WTRU uses the current extended service request message with a new service type set to "mobile originated CS over PS." Alternatively, a new message may be defined to request for CS over PS. The service request may also be used, and optionally with a request type set to "mobile originated CS over PS", to make a request for CS over PS services. Regardless, the WTRU may also indicate that the call is an emergency call by setting the service type to a "mobile originated emergency call."

In all the messages identified above, the WTRU may include a request type accordingly, e.g., "mobile originated CS over PS." The WTRU may use a new establishment cause set accordingly.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method, implemented by a wireless transmit/receive unit (WTRU), for providing non-packet switched service in a target radio access technology (RAT) network, the method comprising:
receiving a circuit switched (CS) service notification message including an explicit indication that indicates an identity the WTRU is to use after performing an inter-system change from a source RAT network to a target RAT network, wherein the explicit indication includes at least one bit which has a bit value of one that indicates an international mobile subscriber identity (IMSI) of the WTRU should be used after the inter-system change is performed and a bit value of zero that indicates that a temporary mobile subscriber identity (TMSI) allocated for the WTRU should be used after the inter-system change is performed; and
transmitting a paging response message including an identity identified by the explicit indication after the inter-system change is performed.

2. The method of claim 1 wherein the WTRU has been allocated a valid temporary mobile subscriber identity (TMSI), and the explicit indication is an information element (IE) that indicates the TMSI.

3. The method of claim 1 wherein the WTRU has not been allocated a valid temporary mobile subscriber identity (TMSI), and the explicit indication is an information element (IE) that indicates an international mobile subscriber identity (IMSI) that identifies the WTRU.

4. The method of claim 1 wherein the CS service notification message is for terminating a CS call request.

5. The method of claim 1 wherein the source RAT network is a long term evolution (LTE) network, and the target RAT network is a third generation partnership project (3GPP) network.

6. A wireless transmit/receive unit (WTRU) for providing non-packet switched service in a target radio access technology (RAT) network, the WTRU comprising:
a receiver configured to receive a circuit switched (CS) service notification message including an explicit indication that indicates an identity the WTRU is to use after performing an inter-system change from a source RAT network to a target RAT network, wherein the explicit indication includes at least one bit which has a value that indicates an international mobile subscriber identity (IMSI) of the WTRU should be used after the inter-system change is performed and another value that indicates that a temporary mobile subscriber identity (TMSI) allocated for the WTRU should be used after the inter-system change is performed; and
a transmitter configured to transmit a paging response message including an identity identified by the explicit indication after the inter-system change is performed.

7. The WTRU of claim 6 wherein the WTRU has been allocated a valid temporary mobile subscriber identity (TMSI), and the explicit indication is an information element (IE) that indicates the TMSI.

8. The WTRU of claim 6 wherein the WTRU has not been allocated a valid temporary mobile subscriber identity (TMSI), and the explicit indication is an information element (IE) that indicates an international mobile subscriber identity (IMSI) that identifies the WTRU.

9. The WTRU of claim 6 wherein the CS service notification message is for terminating a CS call request.

10. The WTRU of claim 6 wherein the source RAT network is a long term evolution (LTE) network, and the target RAT network is a third generation partnership project (3GPP) network.

11. A method, implemented by a wireless transmit/receive unit (WTRU), for providing non-packet switched service in a target radio access technology (RAT) network, the method comprising:
receiving a circuit switched (CS) service notification message including an explicit indication that indicates an identity the WTRU is to use after performing an inter-system change from a source RAT network to a target RAT network, wherein the explicit indication includes at least one bit which has a value that indicates an international mobile subscriber identity (IMSI) of the WTRU should be used after the inter-system change is performed and another value that indicates that a temporary mobile subscriber identity (TMSI) allocated for the WTRU should be used after the inter-system change is performed; and
transmitting a paging response message including an identity identified by the explicit indication after the inter-system change is performed.

12. The method of claim 11 wherein the WTRU has been allocated a valid temporary mobile subscriber identity (TMSI), and the explicit indication is an information element (IE) that indicates the TMSI.

13. The method of claim 11 wherein the WTRU has not been allocated a valid temporary mobile subscriber identity (TMSI), and the explicit indication is an information element (IE) that indicates an international mobile subscriber identity (IMSI) that identifies the WTRU.

14. The method of claim 11 wherein the CS service notification message is for terminating a CS call request.

15. The method of claim 11 wherein a bit value of one indicates that an international mobile subscriber identity (IMSI) of the WTRU should be used after the inter-system change is performed, and a bit value of zero indicates that a temporary mobile subscriber identity (TMSI) allocated for the WTRU should be used after the inter-system change is performed.

16. The method of claim 11 wherein the source RAT network is a long term evolution (LTE) network, and the target RAT network is a third generation partnership project (3GPP) network.

17. A wireless transmit/receive unit (WTRU) for providing non-packet switched service in a target radio access technology (RAT) network, the WTRU comprising:
a receiver configured to receive a circuit switched (CS) service notification message including an explicit indication that indicates an identity the WTRU is to use after performing an inter-system change from a source RAT network to a target RAT network, wherein the explicit indication includes at least one bit which has a value that indicates an international mobile subscriber identity (IMSI) of the WTRU should be used after the inter-system change is performed and another value that indicates that a temporary mobile subscriber identity (TMSI) allocated for the WTRU should be used after the inter-system change is performed; and
a transmitter configured to transmit a paging response message including an identity identified by the explicit indication after the inter-system change is performed.

18. The WTRU of claim 17 wherein the WTRU has been allocated a valid temporary mobile subscriber identity (TMSI), and the explicit indication is an information element (IE) that indicates the TMSI.

19. The WTRU of claim 17 wherein the WTRU has not been allocated a valid temporary mobile subscriber identity (TMSI), and the explicit indication is an information element (IE) that indicates an international mobile subscriber identity (IMSI) that identifies the WTRU.

20. The WTRU of claim 17 wherein the CS service notification message is for terminating a CS call request.

21. The WTRU of claim 17 wherein a bit value of one indicates that an international mobile subscriber identity (IMSI) of the WTRU should be used after the inter-system change is performed, and a bit value of zero indicates that a temporary mobile subscriber identity (TMSI) allocated for the WTRU should be used after the inter-system change is performed.

22. The WTRU of claim 17 wherein the source RAT network is a long term evolution (LTE) network, and the target RAT network is a third generation partnership project (3GPP) network.

\* \* \* \* \*